Patented Dec. 24, 1940

2,225,782

UNITED STATES PATENT OFFICE 2,225,782

REACTION OF METAL CATALYSTS

Vladimir N. Ipatieff and Ben B. Corson, Chicago, Ill., assignors to Universal Oil Products Company, Chicago, Ill., a corporation of Delaware No Drawing. Application October 31, 1938, Serial No. 238,070

4 Claims. (Cl. 23—238)

This invention relates particularly to the treatment of spent metal catalysts which have become fouled by the deposition of carbonaceous materials and the formation of sulfides during their use in hydrocarbon conversion reactions involving petroleum fractions which contain appreciable amounts of sulfur.

The invention is more particularly directed to the reactivation of these spent materials so that their original catalytic activity in promoting certain types of reactions is sufficiently restored to warrant their further utilization.

Reduced metal catalysts are effective in accelerating various types of hydrocarbon reactions such as, for example, cracking reactions employed in connection with petroleum fractions, in dehydrogenation of specific hydrocarbon fractions or compounds, and in the hydrogenation of unsaturated organic compounds either of a simple hydrocarbon or a more complicated character. During the course of such reactions, heavy carbonaceous materials are formed in considerable amounts and these deposit upon the surfaces and in the pores of the active catalytic metals while any sulfur present in the materials undergoing reaction combines with the metal to form sulfides which further coat and impair the activity of the catalysts. These poisoning reactions are more generally in evidence, the greater the activity of the catalyst and consequently are very noticeable in connection with reduced nickel catalysts since nickel has a very high catalytic activity in all types of hydrocarbon conversion reactions and is used to a large extent commercially in processes involving the hydrogenation of unsaturated hydrocarbons such as, for example, the octenes produced by the polymerization of butenes in petroleum refining processes.

In one specific embodiment the present invention comprises a process for reactivation of spent metal and particularly nickel catalysts involving the following series of steps: (1) steaming at moderate temperatures to remove volatile organic matter; (2) oxidation of residual carbonaceous deposits to carbon oxides and water and of nickel sulfide to nickel sulfate by the application of moist air or oxygen; (3) removal of sulfur from nickel sulfate by gaseous ammonia or mixtures of ammonia and hydrogen.

Step 1 of the process is employed to remove substantially all adhering materials which can be volatilized by steam so that less load is placed on the second and third steps. Superheated steam is preferably employed and temperatures within the approximate range of 500–1000° F. may be used depending upon the type of material to be volatilized.

In the second step, the temperature employed will be dependent upon the amount of sulfur present as sulfide and may vary from approximately 500–1300° F. Treatment is continued until sulfide has been completely converted to sulfate, which can be determined by tests on samples drawn from the catalyst bed. During this step some sulfur will be eliminated as sulfur dioxide and sulfur trioxide, depending upon the temperature employed, the rate of oxidizing gas flow, and other factors. At the end of the second step, no compound of nickel should be present except oxides and sulfates, the latter being in predominating amounts.

In the third step of the process, the nickel sulfate is subjected to the action of a mixture of ammonia and hydrogen which simultaneously removes the sulfur in the sulfate as sulfur dioxide and reduces the residual nickel oxides to metallic nickel. The essential reactions taking place at this stage of the reactivation are given by the following equation:

2NiSO$_4$+H$_2$+2NH$_3$  2Ni+2SO$_2$+4H$_2$O

The present process is principally applicable to composite catalysts comprising relatively inert materials supporting reduced metals and has been found highly advantageous in the reactivation of catalysts consisting of nickel supported on kieselguhr, these catalysts having been made by pelleting kieselguhr and hydrated nickel carbonate, using lubricants such as graphite in the pilling operation and reducing directly with hydrogen at temperatures of the order of 500–800° F. These catalysts are highly active in hydrogenating olefinic hydrocarbons to produce their saturated counterparts. The operations of the process are simple since gaseous materials only are admitted in succession to spent catalyst masses and reactivations can be employed without removing the spent catalyst from the chambers in which they are used in the hydrogenation of hydrocarbons or hydrocarbon mixtures.

The following examples are given to show the type of results normally obtainable in the practice of the process although not with the intention of imposing exactly corresponding limitations upon the invention's proper scope.

*Example I*

A sample of used nickel catalyst supported on a siliceous carrier containing 5.5% sulfur by weight of nickel present was steamed at a temperature of 800° F. for two hours and oxidized with moist air at 1292° F. (700° C.) for a period of 17 hours. After this time the material showed complete absence of sulfide sulfur, the sulfur present being entirely in the form of sulfate. Some sulfur was eliminated as sulfur dioxide as shown by analysis of the exit gases during this period. In the second step of the process, moist oxygen and ammonia were alternately used for periods of one-half hour each at 1051° F. (566° C.) for a total time of 9 hours. During the periods when ammonia was being passed, the exit gas was found to be 97% nitrogen. 98.2% of the original sulfur was found to have been eliminated, the remainder being present as sulfate and exerting no harmful influence on the catalytic properties of the nickel, which showed a restoration of approximately 90% of its original activity in hydrogenating a mixture of octenes to octanes.

*Example II*

A used nickel catalyst containing 14.6% of sulfur based on its nickel content was first steamed at 750° F. for one hour to remove readily distillable adsorbed material and then oxidized with moist air at 752° F. (400° C.) for three hours. Following this treatment, a mixture of equal volumes of ammonia and hydrogen was passed through the partly treated material at the same temperature for 2¼ hours. By these two steps 45% of the original sulfur was removed, 59% of this appearing as sulfur dioxide during the air treatment and 41% in the same compound during the ammonia-hydrogen treatment.

The original catalyst had been used in the desulfurization of a cracked pressure distillate by partial hydrogenation and had become substantially inactive. The partially desulfurized material was found to have substantially the same activity as the original in that it was able to lower the sulfur content of the pressure distillate from 0.47 to 0.10%.

We claim as our invention:

1. A process for regenerating spent metal catalysts in which at least a portion of the metal is present in the sulfide form, which comprises converting the metal sulphide to sulphate by subjecting the spent catalyst to oxidation with an oxygen-containing gas, and then reducing the sulphate to metal by treating the catalyst with ammonia.

2. A process for regenerating spent metal catalysts in which at least a portion of the metal is present in the sulfide form, which comprises converting the metal sulphide to sulphate by subjecting the spent catalyst to the action of air at a temperature of about 500 to 1300° F., and then reducing the sulphate to metal by treating the catalyst with ammonia at a temperature of about 800 to 1200° F.

3. A process for regenerating spent nickel catalysts in which at least a portion of the nickel is present in the sulfide form, which comprises converting the natural sulphide to sulphate by subjecting the spent catalyst to oxidation with an oxygen-containing gas, and then reducing the sulphate to metallic nickel by treating the catalyst with ammonia.

4. A process for regenerating spent nickel catalysts in which at least a portion of the nickel is present in the sulfide form, which comprises converting the natural sulphide to sulphate by subjecting the spent catalyst to the action of air at a temperature of about 500 to 1300° F., and then reducing the sulphate to metallic nickel by treating the catalyst with ammonia at a temperature of about 800 to 1200° F.

VLADIMIR N. IPATIEFF.
BEN B. CORSON.